No Printed Specification Availabl

8949X

A. Bingham,

Door Latch.

Patented July 7, 1835.

AM. PHOTO-LITHO. CO. N.Y. (OSBORNE'S PROCESS.)

8949X July 7, 1835

Albert Bingham, of Unity, Me:
Letters Patent

The Schedule referred to in these Letters Patent and making part of the same, containing a description in the words of the said Albert Bingham, himself of his improvement in the Door Latch and Lock.

---

Figure 1:
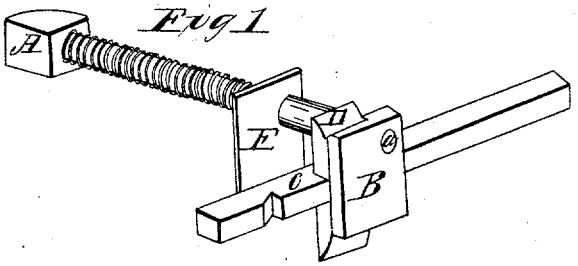
Figure 2:
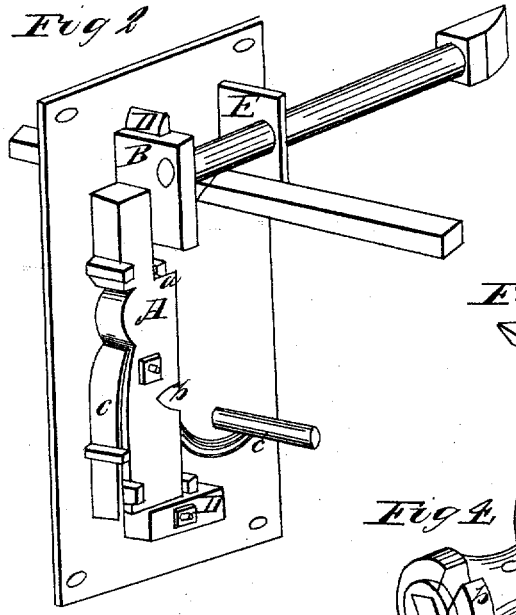

To all to whom these presents shall come: Be it known that I Albert Bing-ham of Unity in the County of Waldo, and State of Maine have invented a new and useful improvement in a door latch and lock, and that the fol-lowing is a full and accurate description thereof, reference being had to the annexed drawings. Fig. 1. represents the important parts of the latch and their relative positions when applied to the door. A. is a bolt of iron three and one half inches long and otherwise variable in size as more or less strength is required. one end is squared and bevelled in the manner of other sliding bolts: on the other end is screwed a nut "B" one inch long. three fourths wide and one eight thick, having the screw hole near the corner as at "a". When this nut is screwed on its side most remote from the screw hole must be on that side of the bolt which is opposite the bevelled side. "C" is the knob spindle which may be square or round and is long enough to reach through the thickness of the door and receive a knob on each end. It should be the same size its whole length that it may enter the knobs more or less according to the thickness of the door. one inch from one end is an arm or brace "D" crossing at right angles, about one and one fourth inch long and three eighths wide, and is either wrought solid with the spindle or rivetted thereto. E. is a piece of sheet iron 1½ inches long and 3/4 wide, having a hole near one corner for the bolt to slide in. this also serves for a bearing or stop to resist the coiled spring placed between it and the square end of the bolt. Fig. 2. is a representation of the inside of the lock and also gives a reversed view of the latch. The lock consists of a metalic plate about four inches long by two wide. A is the lock bolt made to slide easily between four small posts set in the plate. it must be so situated on the plate with regard to the hole through which the spindle passes, that when the bolt is thrown forward

Figure 3:
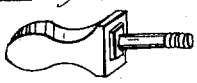
Figure 5:
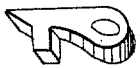
Figure 4:
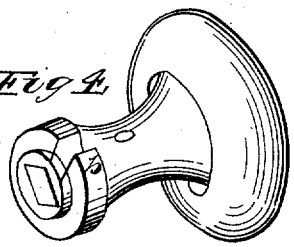

8949X as in the act of locking, its end shall pass immediately behind the nut B and
thus prevent the latch bolt from being thrown back. about 3/4 of an inch from the
end of this lock bolt is a shoulder, which meeting one of the posts prevents the
lock bolt from moving too far in that direction. To the post at the other end
and on the opposite side of the bolt is rivetted one end of a flat spring "c".
with its other end so curved as to bear on the lock bolt, and pass over a swell
therein when it is moved. On the side opposite the spring is a notch "b" in which
the key takes its hold when turning on the pivot "C". The bolt is confined to
the plate by a small button or knob represented by figure 3d. which passes through
the plate and bolt and is confined by a screw and nut as at "e" fig. 2d. In
the plate is cut a hole for the lesser shoulder of the button or knob to slide in.
D is a guard bolt attached to the plate like the lock bolt and is so situated
on the plate that it may intersect the lock bolt, and prevent its being thrown
back by the key. or, I effect the same object by a small button on the outside
of the plate, which checks the knob fig. 3d. Fig. 4th. shews the form of a brass
knob to be used on a square spindle. The small neck is to pass through the
escutcheon or lock plate and forms the arbor on which the knobs and spindle
turn. at "b" is a notch in the shoulder of the knob to receive the dog represen-
ted by fig. 5. which is to be attached to the inside escutcheon and made to
take its hold in said notch when the work is put together, thus forming an
inside fastening when the latch is used without the lock. The escutcheons
and plates may be formed variously as strength or beauty is required.
The mode of applying the above door latch and lock to the door is to bore
an inch and a half hole into the door stile at a convenient height three
fourths of an inch deep. forming a chamber for the nut and the arms of
the spindle to move in, and being at such a distance from the edge of
the door as to allow the latch bolt to project the whole length of its bevel
Then bore a hole into the edge of the door for the latch bolt and coiled
spring in. If the hinges are upon the right when the operation is on the
inside of the door, this last hole must be bored so much above the centre
of the first as to allow the latch bolt to pass just over the spindle, and if on
the other hand it must be as much below. The sheet iron bearing or stop
must be driven in edgewise across the chamber perpendicularly so that

8949X the centre of the pole therein shall coincide with the center of that last
bored and so far the center of the chamber, that it shall not interfere with
the arms of the spindle when turning the required distance.
The groove for the lock bolt to slide in, must be cut, and a place for the
key to turn in, must be bored in the door. Their places may be determined
by measurement or trial. What I claim as my own invention and not
previously known in the above door latch and lock is the application
of the dog to the knob as an inside fastening as before described and not
the arrangement and adaptation of the several parts as above mentioned.
In testimony that the above is a full and accurate specification of my
invention I have hereto set my hand this twenty seventh day of June
in the year of our Lord one thousand eight hundred and thirty five.

Witnesses
Louis Beeber
L. G. Kneller

Albert Bingham 12.32.1881 (Drawing) [illegible]